(12) United States Patent
Wyman et al.

(10) Patent No.: US 7,746,408 B2
(45) Date of Patent: Jun. 29, 2010

(54) METHOD AND SYSTEM FOR IMPROVING THE APPEARANCE OF DEINTERLACED CHROMA FORMATTED VIDEO

(75) Inventors: Richard Hayden Wyman, Sunnyvale, CA (US); Darren D. Neuman, Palo Alto, CA (US); Brian F. Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 1178 days.

(21) Appl. No.: 11/349,658

(22) Filed: Feb. 8, 2006

(65) Prior Publication Data

US 2007/0182848 A1   Aug. 9, 2007

(51) Int. Cl.
    *H04N 11/02* (2006.01)
(52) U.S. Cl. ...................................... 348/450
(58) Field of Classification Search .................. None
    See application file for complete search history.

(56) References Cited

U.S. PATENT DOCUMENTS

| | | | | |
|---|---|---|---|---|
| 5,650,824 | A * | 7/1997 | Huang | 348/453 |
| 5,712,687 | A * | 1/1998 | Naveen et al. | 348/453 |
| 6,088,062 | A * | 7/2000 | Kanou et al. | 348/441 |
| 6,297,801 | B1 * | 10/2001 | Jiang | 345/603 |
| 6,417,891 | B1 * | 7/2002 | Cacciatore et al. | 348/649 |
| 6,583,824 | B2 * | 6/2003 | Cacciatore et al. | 348/649 |
| 7,006,147 | B2 * | 2/2006 | Willis | 348/448 |
| 7,193,655 | B2 * | 3/2007 | Nicolas | 348/448 |
| 7,268,834 | B2 * | 9/2007 | Lundberg et al. | 348/590 |
| 7,375,760 | B2 * | 5/2008 | Kempf et al. | 348/441 |
| 7,408,992 | B2 * | 8/2008 | Adams | 375/240.27 |
| 7,474,355 | B2 * | 1/2009 | Leone et al. | 348/453 |
| 7,511,714 | B1 * | 3/2009 | Amann et al. | 345/603 |
| 2004/0207755 | A1 * | 10/2004 | Lin | 348/453 |
| 2008/0122860 | A1 * | 5/2008 | Amann et al. | 345/603 |

* cited by examiner

*Primary Examiner*—Paulos M Natnael
(74) *Attorney, Agent, or Firm*—McAndrews, Held & Malloy, Ltd.

(57) ABSTRACT

Herein described is a system and method for improving the appearance of video by generating an improved 4:2:2 chroma. The system comprises a 4:2:2 to 4:2:0 chroma regenerator that regenerates 4:2:0 chroma given a received 4:2:2 chroma, and a 4:2:0 to 4:2:2 chroma generator that weaves and interpolates the regenerated 4:2:0 chroma to yield an adjusted 4:2:2 chroma. The system further comprises a blending system used for blending the adjusted 4:2:2 chroma with the received 4:2:2 chroma based on a control input provided by a motion indication signal. The method comprises regenerating a 4:2:0 chroma from a received 4:2:2 chroma using an algorithm. The method further comprises generating an adjusted 4:2:2 chroma using the regenerated 4:2:0 chroma using another algorithm. The method further comprises blending the adjusted 4:2:2 chroma with the received 4:2:2 chroma to generate an improved 4:2:2 chroma.

30 Claims, 13 Drawing Sheets

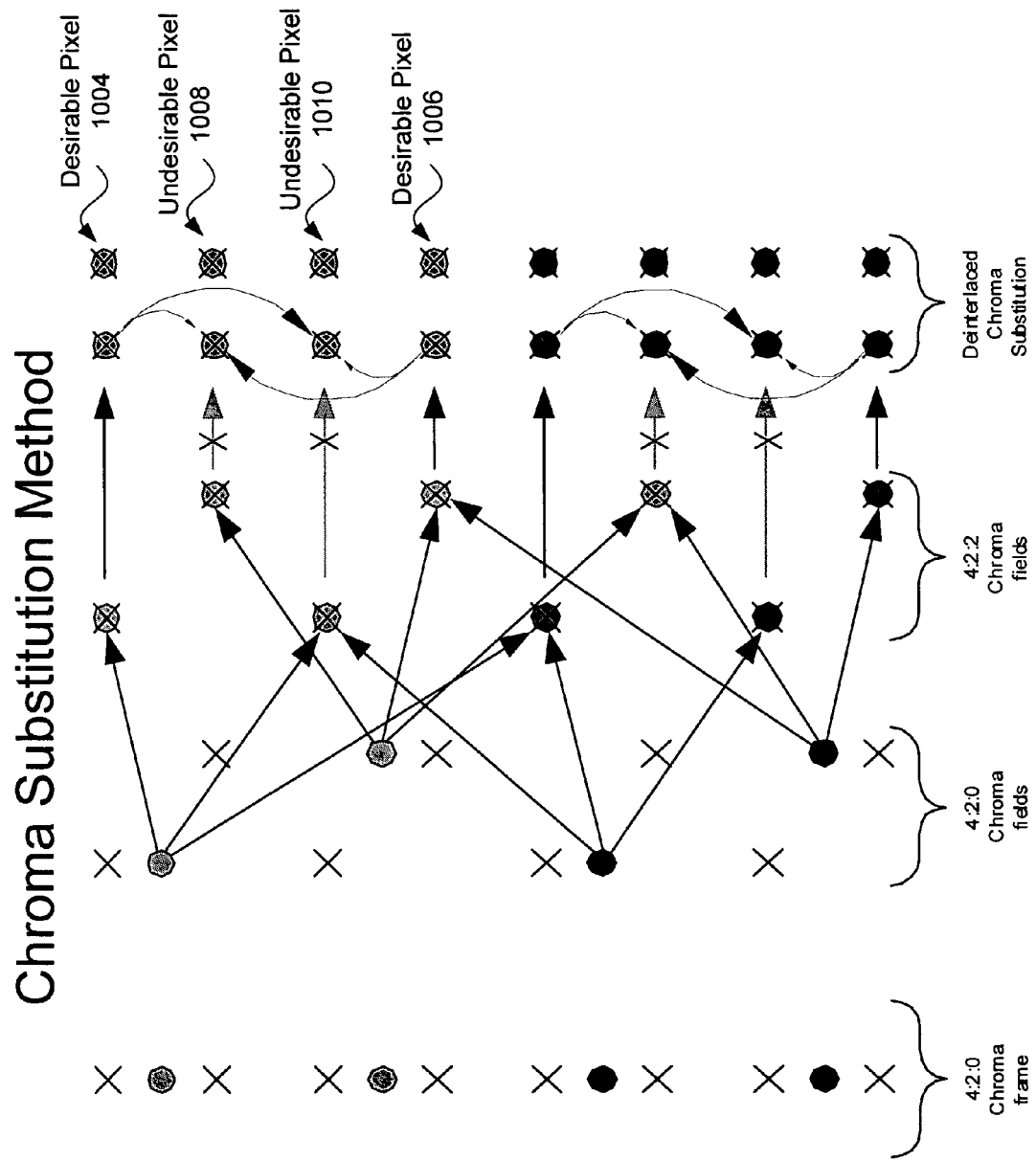

METHOD AND SYSTEM FOR IMPROVING THE APPEARANCE OF DEINTERLACED CHROMA FORMATTED VIDEO

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Many consumer level video sources, such as DVDs and digital cable/satellite carriers provide 4:2:0 chroma video to a video display appliance. Subsequently, the video appliance converts the 4:2:0 chroma video into 4:2:2 chroma video, such that it may be displayed using an interlaced display. Additionally, the 4:2:2 chroma video may be deinterlaced to provide progressive video at twice the original 4:2:0 chroma frame rate.

When a typical 4:2:0 chroma frame is converted to 4:2:2 chroma frames, two 4:2:0 chroma fields are generated. The two 4:2:0 chroma fields comprise a top 4:2:0 chroma field and a bottom 4:2:0 chroma field. Subsequently, two corresponding top and bottom 4:2:2 chroma fields may be generated by vertically interpolating their respective top and bottom 4:2:0 chroma fields. Thereafter, the top and bottom 4:2:2 chroma fields are transmitted to a deinterlacer. The deinterlacer may deinterlace the 4:2:2 chroma fields in one of two ways. The deinterlacer may "weave" chroma samples from adjacent fields to produce progressive video at double the previous frame rate, or it may "bob" (vertically interpolate) chroma from the pixels provided from each respective field. Unfortunately, either option causes undesirable artifacts.

When a deinterlacer performs a "weave", 4:2:2 chroma sample points that are spatially close to 4:2:0 sample points generate colors that are similar. However, the 4:2:2 chroma sample points that are distant from a given 4:2:0 point are heavily interpolated between the two nearest available 4:2:0 chroma sample points, resulting in degradation of picture quality. When there is a sharp transition of color, from red to green, for example, these heavily interpolated points appear a brownish color. If the deinterlacer weaves chroma from adjacent fields to create absent pixel chroma, one may observe a "hanging chroma line" of brown in the region that should be green, and another "hanging chroma line" of brown in the region that should be red, for example.

Alternatively, when a deinterlacer performs a "bob", the output frame originating from the top field will transition vertically from green to red sooner compared to the bottom field originated output frame; however, the bottom field originated output frame remains green vertically much longer until finally transitioning to red. In this instance, the differences that occur between top and bottom output frames result in undesirable flickering.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide at least a system and a method for improving the appearance of video by way of processing a received 4:2:2 chroma. The processing generates an improved 4:2:2 chroma. The various aspects of the invention are substantially shown in and/or described in connection with at least one of the following figures, as set forth more completely in the claims.

These and other advantages, aspects, and novel features of the present invention, as well as details of illustrated embodiments, thereof, will be more fully understood from the following description and drawings.

BRIEF DESCRIPTION OF THE DRAWINGS

FIG. 10 is a diagram illustrating a method of generating an improved 4:2:2 chroma by substituting one or more chroma values of one or more undesirable 4:2:2 chroma pixels with chroma values associated with desirable 4:2:2 chroma pixels, in accordance with an embodiment of the invention.

DETAILED DESCRIPTION OF THE INVENTION

Figure 1A:
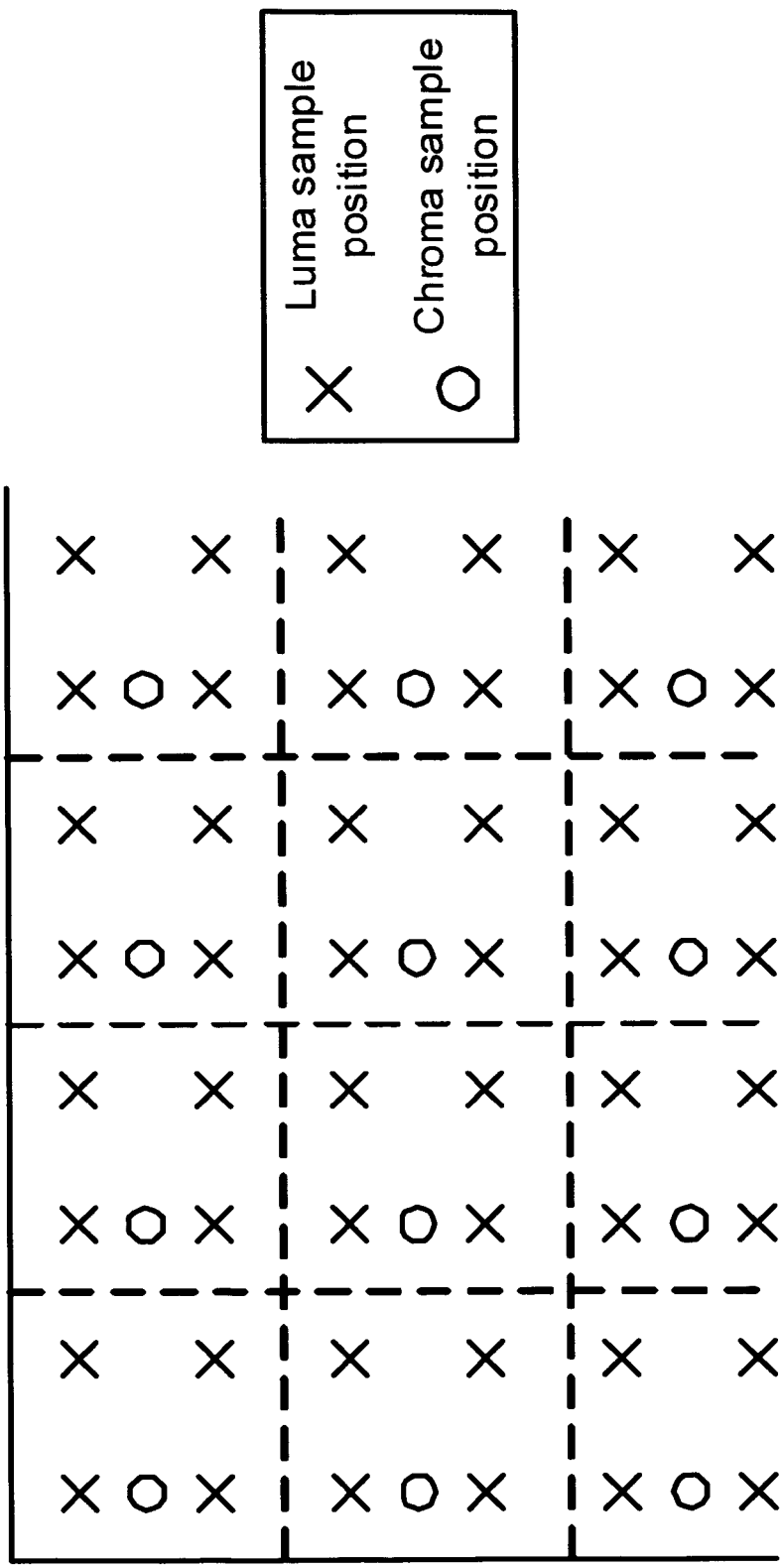
FIGS. 1A and 1B are illustrative diagrams providing a representation of 4:2:0 and 4:2:2 chroma samples (or pixels), respectively, for one or more frames.

Various aspects of the invention provide at least a system and method of improving the appearance of displayed video by way of processing 4:2:2 chroma formatted video. Typically, the 4:2:2 chroma formatted video is obtained when field based 4:2:0 chroma formatted video is interpolated to field based 4:2:2 chroma formatted video, by an MPEG decoder, for example, and then subsequently deinterlaced. This typical process results in undesirable artifacts. In accordance with the various aspects of the invention, the 4:2:2 chroma formatted video is processed using one or more algorithms such that these undesirable artifacts are removed, resulting in a more accurate rendering of the 4:2:2 chroma video. The algorithm that is applied to the 4:2:2 chroma may be based on a knowledge of how the 4:2:2 chroma was initially generated. For example, the system and method of the present invention may be applied to 4:2:2 chroma that was initially generated using a 2-tap linear interpolator. In this instance, the various aspects of the invention utilize a first algorithm that accurately regenerates its corresponding 4:2:0 chroma formatted video by way of solving a set of simultaneous equations that define a 2-tap linear interpolator, as will be described in detail hereinafter. Subsequently, the regenerated 4:2:0 chroma formatted video (which is top and bottom field based) is weaved and interpolated, in accordance with the various aspects of the invention, to yield 4:2:2 chroma formatted video having an improved appearance. When it is not known whether the 4:2:2 chroma was generated using a 2-tap linear interpolator, a second algorithm is used to regenerate its corresponding 4:2:0 chroma formatted video. The second algorithm employs a set of equations to generate the 4:2:0 chroma formatted video. Thereafter, the regenerated 4:2:0 chroma formatted video is weaved and interpolated, in accordance with the various aspects of the invention, to yield 4:2:2 chroma formatted video providing an improved appearance. The benefits provided by the invention are best realized when the various aspects of the invention are applied to still or static 4:2:2 chroma formatted video (i.e., video that displays no motion).

Figure 1B:
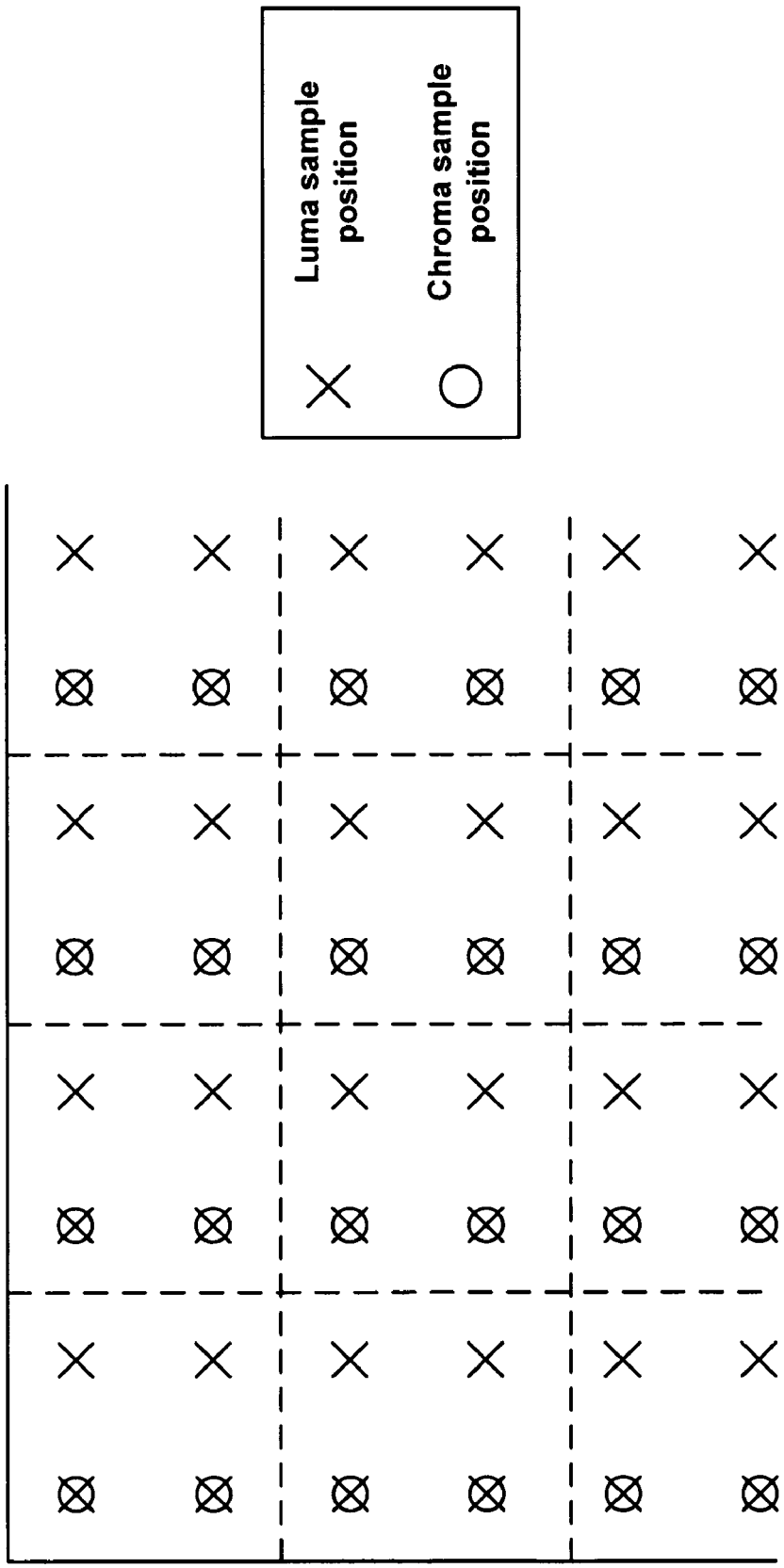

FIGS. 1A and 1B are illustrative diagrams providing a representation of 4:2:0 and 4:2:2 chroma samples (or pixels), respectively, for one or more frames. Luma samples are represented using a cross-hatch mark while chroma sample positions are represented using circular marks. 4:2:0 chroma (i.e., Cb and Cr) is sampled at half the horizontal and half the vertical resolution of the luma (Y) while 4:2:2 chroma (Cb and Cr) is sampled at half the horizontal resolution but at equal the vertical resolution of the luma (Y). An MPEG decoder may, for example, interpolate the 4:2:0 chroma illustrated in FIG. 1A to obtain 4:2:2 chroma illustrated in FIG. 1B. However, as will be seen in FIG. 2, the 4:2:2 chroma generated contains undesirable artifacts.

Figure 2:
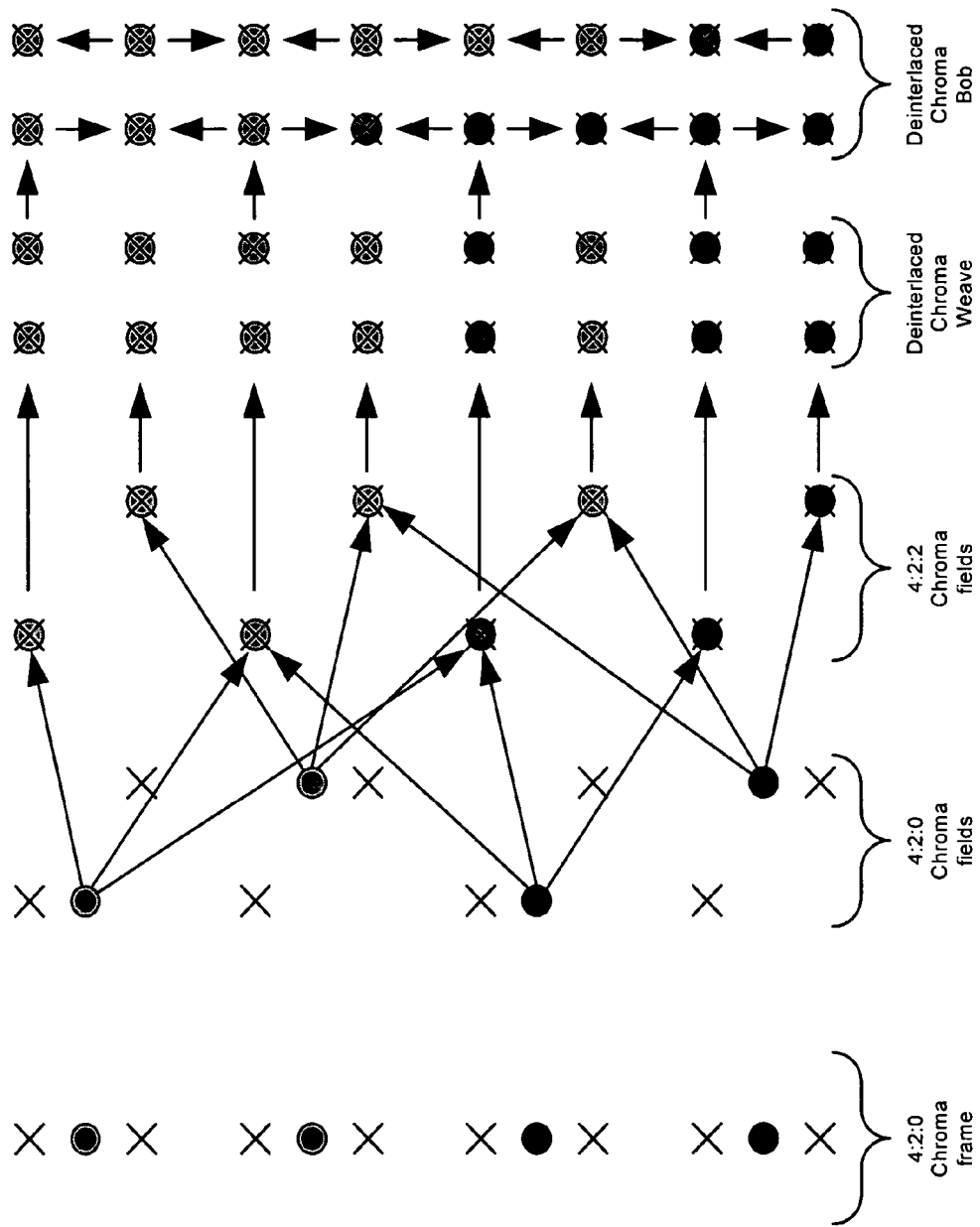
FIG. 2 is a diagram illustrating typical interpolation and deinterlacing of 4:2:0 chroma formatted video.

FIG. 2 is a diagram illustrating typical interpolation and deinterlacing of 4:2:0 chroma formatted video. A 4:2:0 chroma frame is converted into top and bottom 4:2:0 chroma fields. Thereafter, the 4:2:0 chroma fields are vertically interpolated to generate corresponding top and bottom 4:2:2 chroma fields. Referring to the 4:2:2 chroma fields, the endpoints of the arrows indicate what 4:2:0 chroma sample points (i.e., samples or pixels) were used in the vertical interpolation to generate the 4:2:2 chroma field sample points. Subsequently, each of these top and bottom 4:2:2 chroma fields are deinterlaced by "weaving" through the top and bottom 4:2:2 chroma fields to provide two identical progressive frames. The "weaving" produces the "deinterlaced chroma weave" shown in FIG. 2. 4:2:2 chroma sample points that are interpolated from vertically proximate 4:2:0 sample points produce a more accurate vertical interpolation. On the other hand, 4:2:2 chroma sample points that are generated some distance from their nearest 4:2:0 sample points are heavily interpolated, yielding a less accurate vertical interpolation. Alternatively, deinterlacing of 4:2:0 chroma may be performed by "bobbing" (vertically interpolating) adjacent pixels or sample points within their respective top or bottom 4:2:2 chroma fields. When "bobbing" is utilized as shown in the last two vertical sample point columns of FIG. 2, a pair of successive pixels in a top or bottom field may be used to compute the chroma value for a new pixel between the pair. Overall, the effect of either deinterlace method is to provide a doubling of the vertical chroma resolution. However, either method of deinterlacing produces undesirable artifacts.

If a deinterlacer "weaves" chroma from adjacent fields to create the absent pixel chroma, one may see an artifact known as a "hanging chroma line". A "hanging chroma line" may comprise a string of odd colored pixels in a horizontal scan line of video.

Alternatively, a deinterlacer that employs "bobbing" will generate artifacts such as flickering. As may be seen in the right most frame of FIG. 2, there is a disparity between adjacent frames when using the "deinterlaced chroma bob". This results in a loss of picture definition and results in flickering.

As a way of removing such undesirable artifacts, the various aspects of the invention process the 4:2:2 chroma back into its original 4:2:0 chroma, such that the 4:2:2 chroma may be regenerated more accurately, yielding an improved appearance of the displayed video. Aspects of the present invention used for generating 4:2:2 chroma from the regenerated 4:2:0 chroma are described in connection with FIG. 3.

Figure 3:
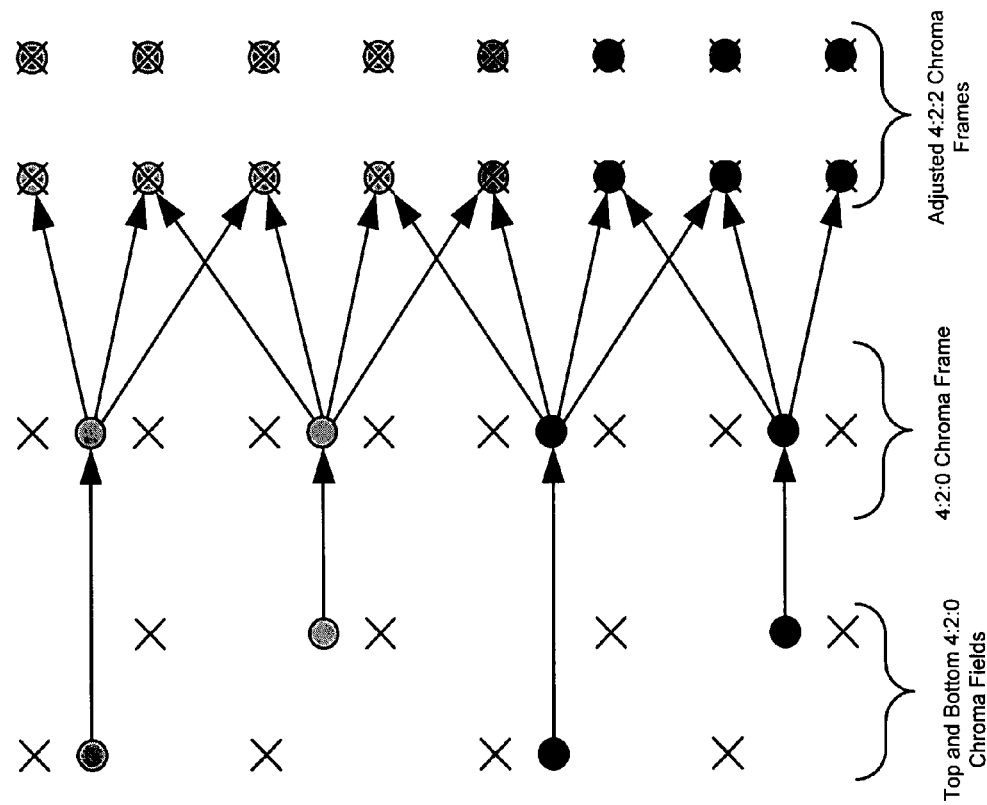
FIG. 3 is a diagram that illustrates an improved method of regenerating 4:2:2 chroma by weaving sample points in the top and bottom fields of 4:2:0 chroma prior to interpolation, in accordance with an embodiment of the invention.

FIG. 3 is a diagram that illustrates an improved method of regenerating 4:2:2 chroma by weaving sample points in the top and bottom fields of 4:2:0 chroma prior to interpolation, in accordance with an embodiment of the invention. After top and bottom 4:2:0 chroma fields are regenerated, adjacent pixels are woven in each respective field, to generate a 4:2:0 chroma frame, as illustrated. Thereafter, the 4:2:0 chroma frame is interpolated into progressive frames which may be referred to as "adjusted" 4:2:2 chroma frames. Each of the progressive frames has frequency equal to the 4:2:0 chroma field rate. The resulting adjusted 4:2:2 chroma is illustrated in FIG. 3. As a result of performing a weave prior to an interpolation, the result is a more precise rendering of 4:2:2 chroma formatted video. The interpolation algorithm used to generate the adjusted 4:2:2 chroma will be described with reference to FIG. 8.

Figure 4:
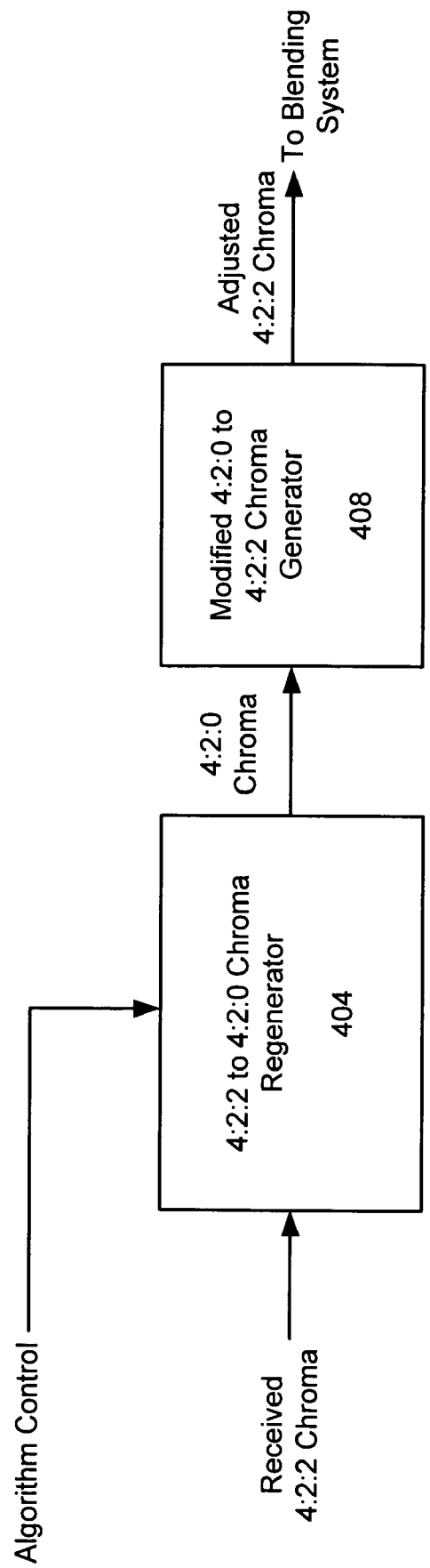
FIG. 4 is a block diagram of a 4:2:2 chroma generation system that generates an adjusted 4:2:2 chroma in accordance with an embodiment of the invention.

FIG. 4 is a block diagram of a 4:2:2 chroma generation system that generates an adjusted 4:2:2 chroma in accordance with an embodiment of the invention. The adjusted 4:2:2 chroma is generated in response to receiving 4:2:2 chroma generated by a typical DVD player, for example. The 4:2:2 chroma generation system comprises a 4:2:2 to 4:2:0 chroma regenerator 404 and a 4:2:0 to 4:2:2 chroma generator 408. The 4:2:2 to 4:2:0 chroma regenerator 404 may receive 4:2:2 chroma provided by an MPEG decoder located within a DVD player, for example. The MPEG decoder may utilize a 2-tap interpolator for generating the 4:2:2 chroma.

Various aspects of the invention utilize the 4:2:2 to 4:2:0 chroma regenerator 404 to accurately reproduce the original 4:2:0 chroma that was used by the MPEG decoder. If it is known that an exemplary MPEG decoder generated the 4:2:2 chroma using a 2-tap interpolator, the 4:2:2 to 4:2:0 chroma regenerator 404 may reverse the operation performed by the 2-tap interpolator, in order to obtain the original 4:2:0 chroma, as will be described in connection with FIGS. 6A and 6B. Otherwise, the 4:2:2 to 4:2:0 chroma regenerator 404 may employ an algorithm that will be described in connection with FIGS. 7A and 7B. Also shown is an algorithm control input provided to the 4:2:2 to 4:2:0 chroma regenerator 504. The algorithm control input provides a signal that determines the type of algorithm used by the 4:2:2 to 4:2:0 chroma regenerator 404.

After the 4:2:2 to 4:2:0 chroma regenerator 404 regenerates the 4:2:0 chroma, the 4:2:0 to 4:2:2 chroma generator 408 performs the weave and interpolation previously described with reference to FIG. 3. As a result of using the embodiment of FIG. 4, undesirable artifacts such as a "hanging chroma line" and/or "flickering" as was previously described with reference to FIG. 2, are minimized. Subsequently, the 4:2:0 to 4:2:2 chroma generator 408 provides an adjusted 4:2:2 chroma output to a blending system. The blending system blends the adjusted 4:2:2 chroma to the received 4:2:2 chroma based on the amount of motion present in the received video. The blending system will be described in connection with FIG. 5.

Figure 5:
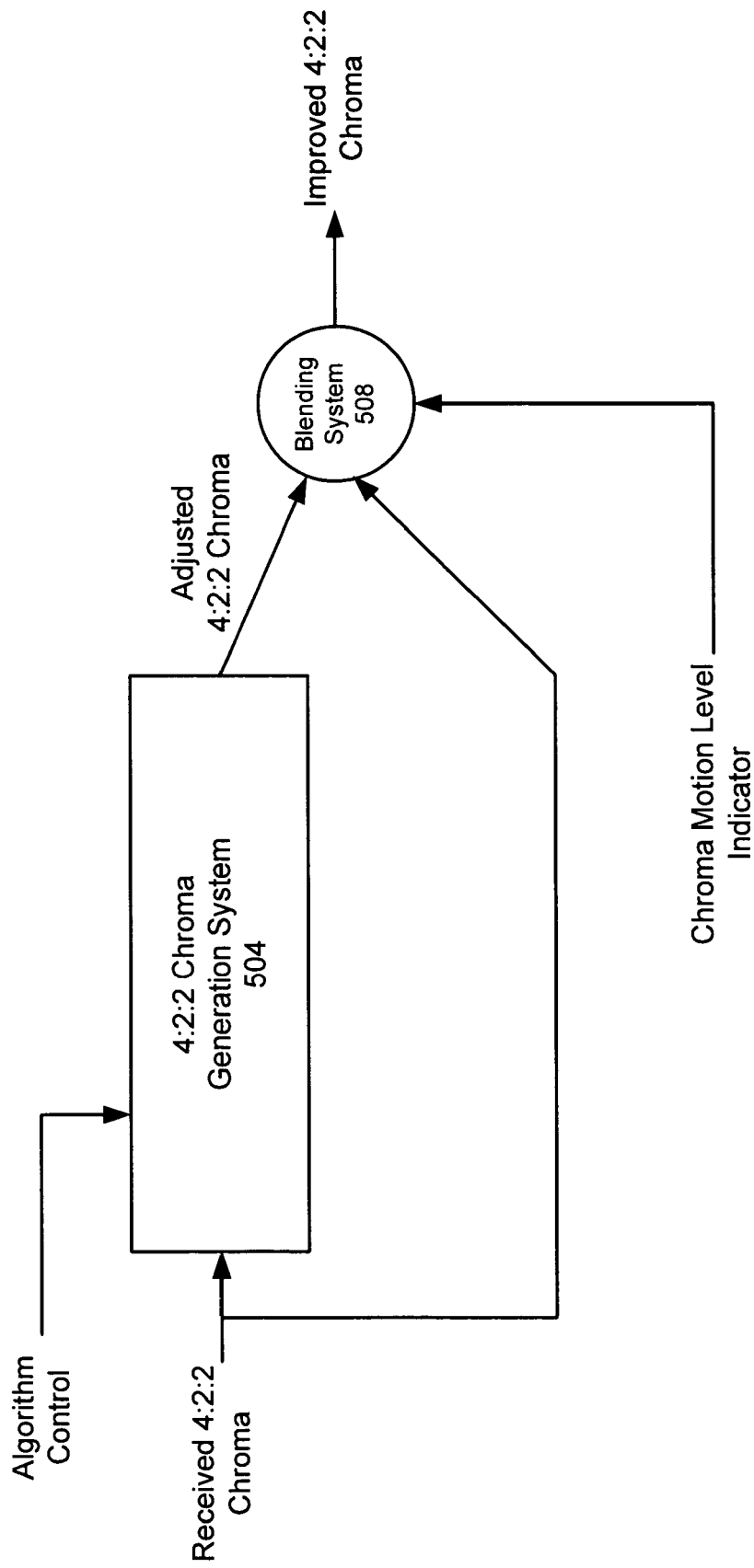
FIG. 5 is a block diagram of an improved 4:2:2 chroma generation system in accordance with an embodiment of the invention.

FIG. 5 is a block diagram of an improved 4:2:2 chroma generation system in accordance with an embodiment of the invention. The improved 4:2:2 chroma generation system comprises a 4:2:2 chroma generation system 504 and a blending system 508. The 4:2:2 chroma generation system 504 was previously described in connection with FIG. 4. As a consequence, the reader may refer to the details of the 4:2:2 chroma generation system 504 previously described in connection with FIG. 4. A received 4:2:2 chroma is input into the 4:2:2 chroma generation system 504 and an adjusted 4:2:2 chroma is output from the 4:2:2 chroma generation system 504. The blending system 508 receives two inputs: a) the adjusted 4:2:2 chroma provided by the 4:2:2 chroma generation system 504 and b) the non-adjusted (originally received) 4:2:2 chroma (i.e., the signal provided to the 4:2:2 chroma generation system 504). The blending system 508 also receives a control input referred to as a chroma motion level indicator. The chroma motion level indicator may provide a value that determines the amounts of the adjusted 4:2:2 chroma and non-adjusted 4:2:2 chroma that are blended by the blending system 508. When there is no motion in the received 4:2:2 chroma, the blending system 508 may generate a blend that uses little or none of the received 4:2:2 chroma compared to the adjusted 4:2:2 chroma. The amount of adjusted 4:2:2 chroma used in creating the blend decreases with the amount of motion present in the received 4:2:2 video (or received 4:2:2 chroma). The blending system 508 adds a selected amount of adjusted 4:2:2 chroma to a selected amount of 4:2:2 chroma to generate the proper blend. The blending system 508 outputs the blend as an "improved 4:2:2 chroma". The blending system 508 may comprise any type of hardware and/or software.

Figure 6A:
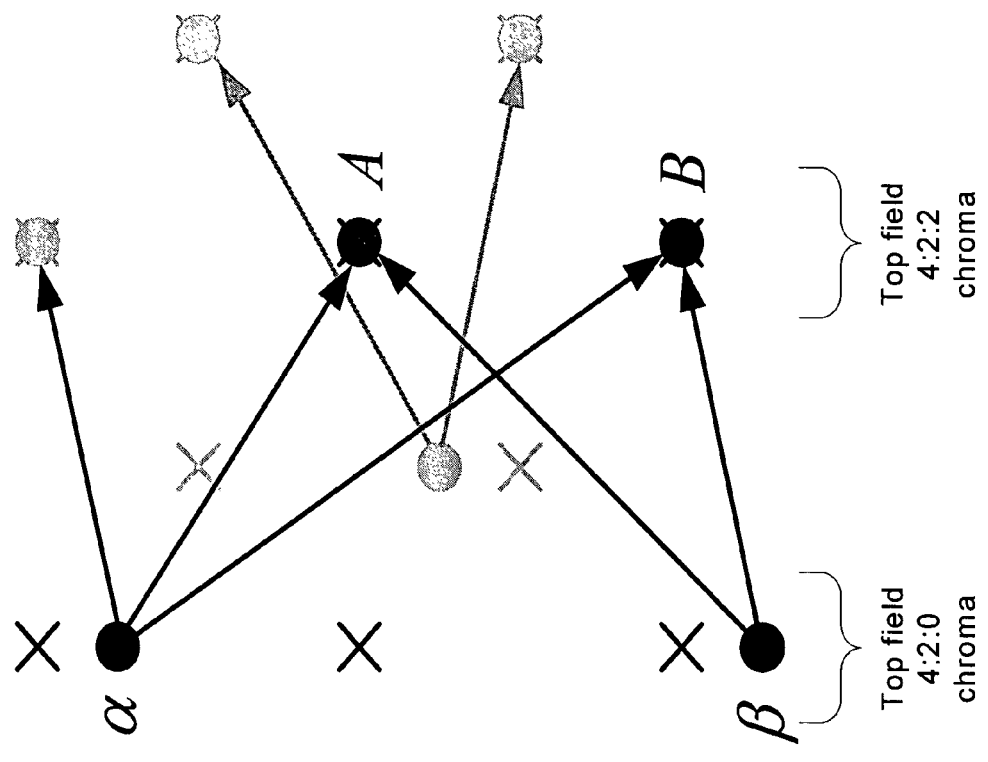
FIG. 6A is a diagram that illustrates a method of regenerating top field 4:2:0 chroma from corresponding top field 4:2:2 chroma in accordance with an embodiment of the invention.

FIG. 6A is a diagram that illustrates a method of regenerating top field 4:2:0 chroma from corresponding top field 4:2:2 chroma in accordance with an embodiment of the invention. The top field 4:2:2 chroma is generated by interpolating the top field 4:2:0 chroma, as indicated by the arrows in FIG. 6A. The interpolation may be implemented using a 2-tap linear interpolator. The 2-tap linear interpolator may be defined using the following equations:

$$A = \frac{5}{8}\alpha + \frac{3}{8}\beta$$

$$B = \frac{1}{8}\alpha + \frac{7}{8}\beta$$

where A and B represent an adjacent 4:2:2 chroma pixel pair in a top field of 4:2:2 chroma while α a and β represent a corresponding pixel pair in a top field of 4:2:0 chroma. As shown in FIG. 6A, pixels α and β, were used to generate pixels A and B. Given the chroma values for A and B, the chroma values for α and β may be found by solving two simultaneous equations, to yield:

$$\alpha = \frac{7}{4}A - \frac{3}{4}B$$

$$\beta = \frac{5}{4}B - \frac{1}{4}A$$

The 4:2:0 pixel pair α and β represents just one pair of one or more repeating pairs in a top field 4:2:0 chroma of 4:2:0 chroma formatted video. Likewise, the 4:2:2 pixel pair A and B represent just one pair of one or more repeating pairs in a top field 4:2:2 chroma of 4:2:2 chroma formatted video. The pixel pairs for each type of chroma format generate a repeating pattern throughout the chroma, as illustrated in FIG. 6A.

Figure 6B:
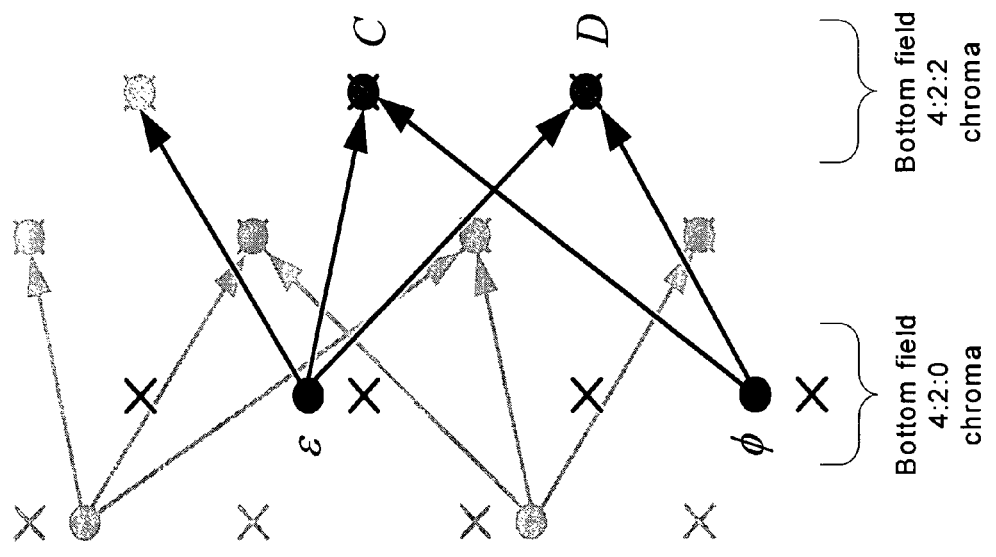
FIG. 6B is a diagram that illustrates a method of regenerating bottom field 4:2:0 chroma from corresponding bottom field 4:2:2 chroma in accordance with an embodiment of the invention.

FIG. 6B is a diagram that illustrates a method of regenerating bottom field 4:2:0 chroma from corresponding bottom field 4:2:2 chroma in accordance with an embodiment of the invention. The bottom field 4:2:2 chroma is generated by interpolating the bottom field 4:2:0 chroma, as indicated by the arrows in FIG. 6B. The interpolation may be implemented using a 2-tap linear interpolator. The 2-tap linear interpolator may be defined using the following equations:

$$C = \frac{7}{8}\varepsilon + \frac{1}{8}\phi$$

$$D = \frac{3}{8}\varepsilon + \frac{5}{8}\phi$$

where C and D represent an adjacent 4:2:2 chroma pixel pair in a bottom field of 4:2:2 chroma while ε and φ represent a corresponding pixel pair in a bottom field of 4:2:0 chroma. As shown in FIG. 6B, pixels ε and φ, were used to generate pixels C and D. Given chroma values for C and D, the chroma values for ε and φ may be found by solving two simultaneous equations, to yield:

$$\varepsilon = \frac{5}{4}C - \frac{1}{4}D$$

$$\phi = \frac{7}{4}D - \frac{3}{4}C$$

The 4:2:0 pixel pair, ε and φ, represent just one pair of one or more repeating pairs in a bottom field 4:2:0 chroma of 4:2:0 chroma formatted video. Likewise, the 4:2:2 pixel pair, C and D, represent just one pair of one or more repeating pairs in a bottom field 4:2:2 chroma of 4:2:2 chroma formatted video. The pixel pairs for each type of chroma format generate a repeating pattern throughout the chroma, as illustrated in FIG. 6B.

The method of regeneration provided by the illustrative embodiments shown in FIGS. 6A and 6B are used when it is determined that a 2-tap linear interpolator was used to generate the 4:2:2 chroma. If it is uncertain that a 2-tap linear interpolator was used, an alternate method is used, as described in connection with the illustrative embodiments of FIGS. 7A and 7B.

Figure 7A:
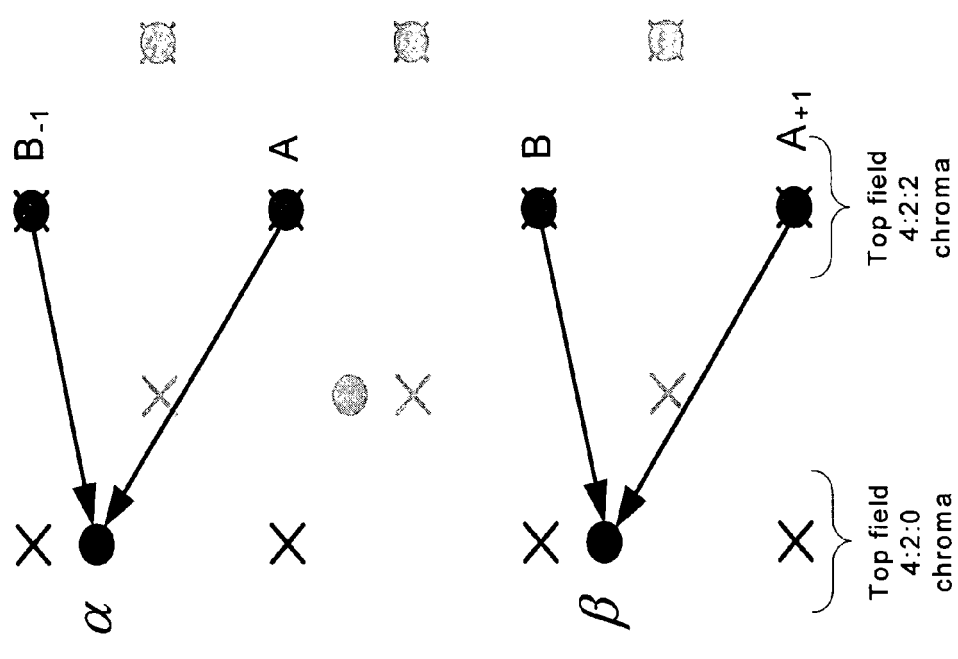
FIG. 7A is a diagram that illustrates a method of regenerating top field 4:2:0 chroma from corresponding top field 4:2:2 chroma in accordance with an embodiment of the invention.

FIG. 7A is a diagram that illustrates a method of regenerating top field 4:2:0 chroma from corresponding top field 4:2:2 chroma in accordance with an embodiment of the invention. The 4:2:0 pixel pair (α and β) and the 4:2:2 pixel pair (A and B) display the same spatial relationship as shown in FIG. 6A. However, the method of FIG. 7A also incorporates the use of pixels in an adjacent repeating pair. The chroma values for pixel $B_{-1}$ and $A_{+1}$, each originating from adjacent pixel pairs, are used to determine the 4:2:0 chroma values for pixel pair, α and β. The 4:2:0 chroma values for pixels α and β are interpolated using the following equations:

$$\alpha = \frac{3}{4}B_{-1} + \frac{1}{4}A$$

$$\beta = \frac{3}{4}B + \frac{1}{4}A_{+1}$$

Figure 7B:
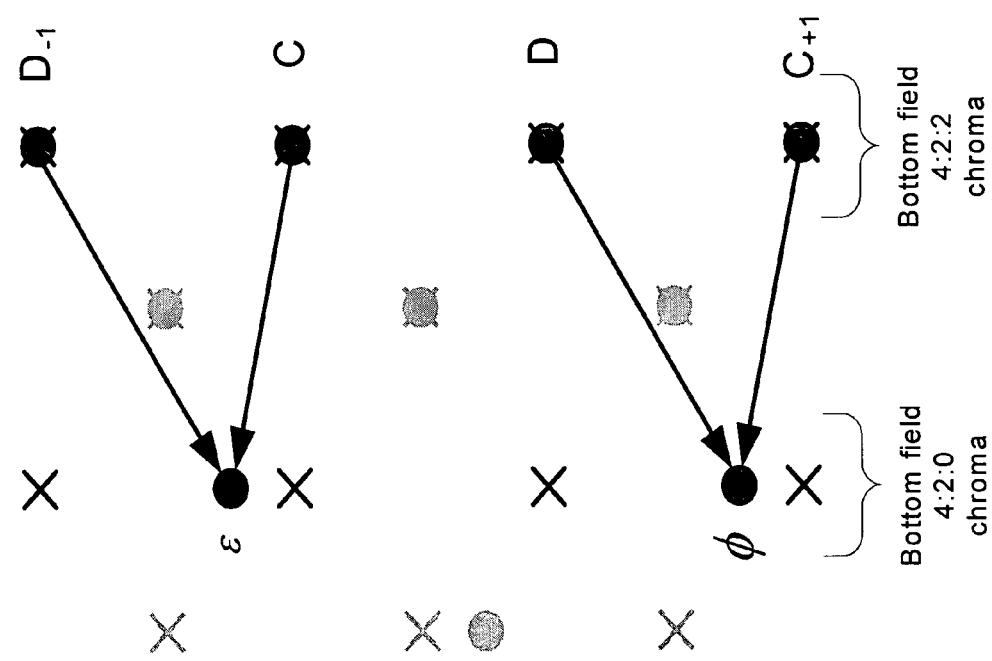
FIG. 7B is a diagram that illustrates a method of regenerating bottom field 4:2:0 chroma from corresponding bottom field 4:2:2 chroma in accordance with an embodiment of the invention.

FIG. 7B is a diagram that illustrates a method of regenerating bottom field 4:2:0 chroma from corresponding bottom field 4:2:2 chroma in accordance with an embodiment of the invention. The 4:2:0 pixel pair (ε and φ) and the 4:2:2 pixel pair (C and D) display the same spatial relationship as shown in FIG. 6B. However, the method of FIG. 7B also incorporates the use of pixels in an adjacent repeating pair. As shown, the chroma values for pixels $D_{-1}$ and $C_{+1}$ of adjacent pixel pairs, are used to determine the 4:2:0 chroma values for pixel pair, ε and φ. The 4:2:0 chroma values for pixels ε and φ are interpolated using the following equations:

$$\varepsilon = \frac{1}{4}D_{-1} + \frac{3}{4}C$$

$$\phi = \frac{1}{4}D + \frac{3}{4}C_{+1}$$

Assuming a particular interpolation function when another interpolation function was used, results in unwanted artifacts. The method of determining the 4:2:0 chroma values from 4:2:2 chroma values, presented in FIGS. 7A and 7B, performs reasonably well regardless of the type of interpolation function that was originally used to create the 4:2:2 chroma.

Because of the repeating pixel pattern defined by the spatial relationships of the pixels, the following equations hold: $\alpha=\beta_{-1}$ or $\beta=\alpha_{+1}$ and $\varepsilon=\phi_{-1}$ or $\phi=\varepsilon_{+1}$, etc. As previously discussed in reference to FIG. 4, the algorithm control input determines what algorithm will be applied.

Figure 8:
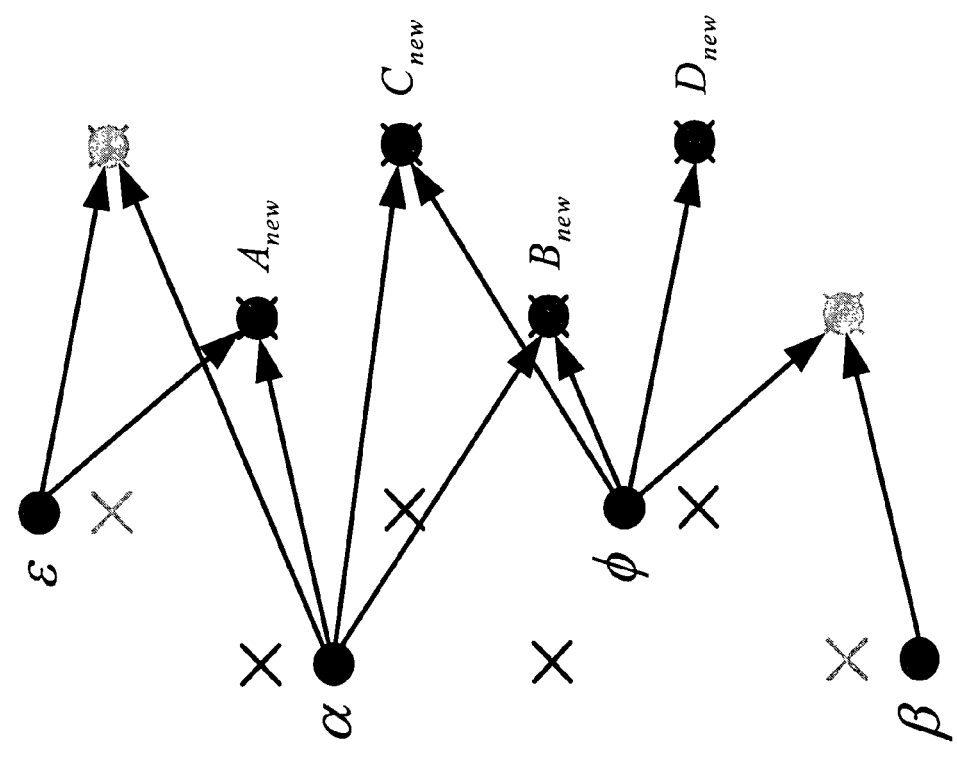
FIG. 8 is a diagram that illustrates 4:2:0 to 4:2:2 chroma generation that employs the method described in connection with FIG. 3, in accordance with an embodiment of the invention.

FIG. 8 is a diagram that illustrates 4:2:0 to 4:2:2 chroma generation that employs the method described in connection with FIG. 3, in accordance with an embodiment of the invention. Given the 4:2:0 chroma values, α, β, ε, and φ, that are generated from either the embodiments described in connection with FIGS. 6A/6B or FIGS. 7A/7B, the 4:2:2 chroma values, $A_{new}$, $B_{new}$, $C_{new}$, and $D_{new}$ may be determined by way of the following equations:

$$A_{new} = \frac{1}{4}\varepsilon + \frac{3}{4}\alpha$$

$$C_{new} = \frac{3}{4}\alpha + \frac{1}{4}\phi$$

$$B_{new} = \frac{1}{4}\alpha + \frac{3}{4}\phi$$

$$D_{new} = \frac{3}{4}\phi + \frac{1}{4}\beta$$

As may be seen in FIG. 8, the values $A_{new}$, $B_{new}$, $C_{new}$, and $D_{new}$ are vertically interpolated from the values α, β, ε, and φ.

Referring back to FIG. 4, the 4:2:2 to 4:2:0 chroma regenerator may be comprise any type of hardware and/or software capable of computing the 4:2:0 chroma values defined by the equations associated with FIGS. 6A/6B and by the equations associated with FIGS. 7A/7B. Furthermore, the 4:2:0 to 4:2:2 chroma generator may comprise any type of hardware and/or software capable of computing the values $A_{new}$, $B_{new}$, $C_{new}$, and $D_{new}$, that were previously defined by the equations that were described with reference to FIG. 8.

Figure 9:
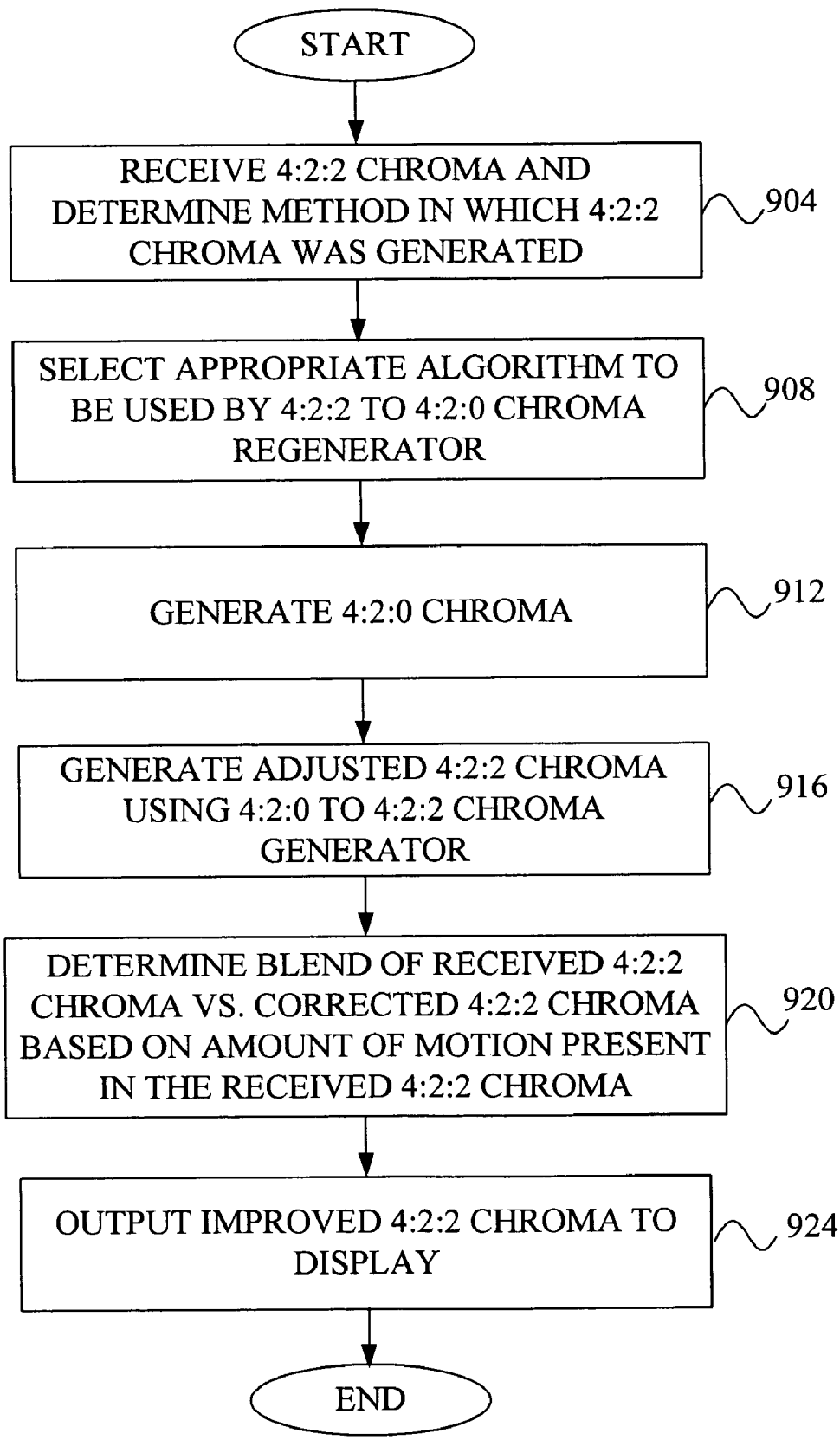
FIG. 9 is an operational flow diagram illustrating a method of generating improved 4:2:2 chroma in accordance with an embodiment of the invention.

FIG. 9 is an operational flow diagram illustrating a method of generating improved 4:2:2 chroma in accordance with an embodiment of the invention. In a representative embodiment, the operational flow diagram of FIG. 9 is employed by the improved 4:2:2 chroma generation system previously described in connection to FIG. 5. At step 904, a determination is made regarding the algorithm for accurately converting the received 4:2:2 chroma back into 4:2:0 chroma. A 2-tap linear interpolator may be used if it is known that it was used as the algorithm for producing the 4:2:2 chroma, for example. At step 908, an appropriate algorithm is selected for use by the 4:2:2 to 4:2:0 chroma regenerator of the improved 4:2:2 chroma generation system. Next, at step 912, 4:2:0 chroma is generated by the 4:2:2 to 4:2:0 chroma regenerator. At step 916, adjusted 4:2:2 chroma is generated using a 4:2:0 to 4:2:2 generator. The 4:2:0 to 4:2:2 generator utilizes a method that weaves top and bottom 4:2:0 chroma fields prior to performing an interpolation. The 4:2:0 to 4:2:2 generator may apply the representative illustrative embodiment previously described in reference with FIG. 3. Thereafter, at step 920, a blending system may be used to determine the appropriate blend of the received 4:2:2 chroma and the adjusted 4:2:2 chroma. The correct blend may be based on the amount of motion present in the received 4:2:2 chroma. A control signal referred to as a chroma motion level indicator may be input into the blending system, as a way to adjust the blend. Finally, at step 924, an improved 4:2:2 chroma is output by the improved 4:2:2 chroma generation system by way of the blending system.

FIG. 10 is a diagram illustrating a method of generating an improved 4:2:2 chroma by substituting one or more chroma values of one or more undesirable 4:2:2 chroma pixels 1008, 1010 with chroma values associated with desirable 4:2:2 chroma pixels 1004, 1006, in accordance with an embodiment of the invention. A desirable 4:2:2 chroma pixel 1004, 1006 is identified as being spatially vertically proximate to a 4:2:0 chroma pixel. Since the 4:2:0 chroma pixel is used to generate its corresponding 4:2:2 chroma pixel, the vertical proximity of the 4:2:0 produces more accurate chroma values when interpolation is performed. Hence its associated 4:2:2 chroma is considered desirable. Referring to FIG. 10, one may see that in the deinterlaced chroma substitution weave (two right most pixel columns), the first 1004 and fourth 1006 of each group of four sample points or pixels of the weave are vertically proximate to a corresponding 4:2:0 pixel or sample point. The first pixel 1004 originates from the top field while the fourth pixel 1006 originates from the bottom field of the 4:2:0 chroma fields. In this representative embodiment, the first 1004 and fourth 1006 pixels of each group of four are considered "good" pixels since they were vertically interpolated from a vertically proximate 4:2:0 sample point or pixel. However, the second 1008 and third 1010 pixels are substantially interpolated from distant 4:2:0 pixels, as shown in FIG. 10. As a consequence, the spatial interpolations of the second 1008 and third 1010 pixels are substituted using the spatial interpolations obtained from the first 1004 and fourth 1006 pixels. In a representative embodiment, a weighted average of the chroma values of the desirable pixels 1004, 1006 (e.g., first and fourth pixels) is used as a substitution value for one or more undesirable pixels 1008, 1010 (e.g., the second and third pixels of this illustrative embodiment). The one or more undesirable pixels 1008, 1010 are spatially located between the desirable pixels 1004, 1006, as shown in FIG. 10. In a representative embodiment, the weights of the weighted average may be chosen such that they are inversely proportional to the vertical distance between an undesirable pixel 1008, 1010 (e.g., the second or third pixel) and a desirable pixel 1004, 1006 (e.g., first or fourth pixel in this illustrative embodiment). Overall, the substitution method provides 4:2:2 postprocessing method in which certain chroma values are substituted using more desirable values. The chroma substitution method described in this illustrative embodiment thereby generates an improved 4:2:2 chroma.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of generating an improved 4:2:2 chroma comprising:
   receiving a 4:2:2 chroma;
   inputting said 4:2:2 chroma into a 4:2:2 to 4:2:0 chroma regenerator;
   selecting an algorithm to be used by said 4:2:2 to 4:2:0 chroma regenerator;
   using said algorithm to regenerate 4:2:0 chroma;
   weaving pixels from top and bottom fields of said 4:2:0 chroma to generate a 4:2:0 chroma frame;
   interpolating values provided by said 4:2:0 chroma frame to generate an adjusted 4:2:2 chroma;
   inputting said adjusted 4:2:2 chroma and said 4:2:2 chroma into a blending system used for blending two inputs;
   determining a first amount of said adjusted 4:2:2 chroma and a second amount of said 4:2:2 chroma for said blending; and
   adding said first and second amounts to generate an improved 4:2:2 chroma.

2. The method of claim 1 wherein said algorithm utilizes the following equations for regenerating said 4:2:0 chroma:

$$A = \frac{5}{8}\alpha + \frac{3}{8}\beta,$$

$$B = \frac{1}{8}\alpha + \frac{7}{8}\beta,$$

$$C = \frac{7}{8}\varepsilon + \frac{1}{8}\phi,$$

$$D = \frac{3}{8}\varepsilon + \frac{5}{8}\phi,$$

wherein A, B, C, and D represent 4:2:2 chroma pixel values, and $\alpha$, $\beta$, $\epsilon$, and $\phi$ represent 4:2:0 chroma pixel values.

3. The method of claim 2 wherein said equations are used if said 4:2:2 chroma was generated using a 2-tap linear interpolator.

4. The method of claim 1 wherein said algorithm utilizes the following equations for regenerating said 4:2:0 chroma:

$$\alpha = \frac{3}{4}B_{-1} + \frac{1}{4}A$$

$$\beta = \frac{3}{4}B + \frac{1}{4}A_{+1},$$

$$\varepsilon = \frac{1}{4}D_{-1} + \frac{3}{4}C,$$

$$\phi = \frac{1}{4}D + \frac{3}{4}C_{+1},$$

wherein A, $A_{+1}$, B, $B_{+1}$, C, $C_{+1}$, and D, $D_{+1}$, represent 4:2:2 chroma pixel values, and $\alpha$, $\beta$, $\epsilon$, and $\phi$ represent 4:2:0 chroma pixel values.

5. The method of claim 1 wherein said determining is based on an input signal for indicating the level of motion present in said 4:2:2 chroma.

6. A method of processing a received 4:2:2 chroma formatted video to improve the appearance of displayed video comprising:
   identifying undesirable pixels of said 4:2:2 chroma that are vertically interpolated using chroma associated with vertically distant 4:2:0 pixels; and
   substituting chroma values associated with said undesirable pixels of said 4:2:2 chroma using a weighted average of one or more chroma values associated with one or more desirable pixels associated with said 4:2:2 chroma.

7. The method of claim 6 wherein a weight of one or more weights of said weighted average is inversely proportional to the vertical distance between an undesirable pixel of said undesirable pixels and a desirable pixel of said one or more desirable pixels.

8. A method of generating an improved 4:2:2 chroma comprising:
   regenerating 4:2:0 chroma from a 4:2:2 chroma;
   weaving said 4:2:0 chroma to produce a 4:2:0 chroma frame;
   interpolating said 4:2:0 chroma frame to generate said adjusted 4:2:2 chroma; and
   adding a determined first level of said 4:2:2 chroma to a determined second level of said adjusted 4:2:2 chroma.

9. The method of claim 8 wherein said interpolating is performed by way of using the following equations:

$$A_{new} = \frac{1}{4}\varepsilon + \frac{3}{4}\alpha,$$

$$C_{new} = \frac{3}{4}\alpha + \frac{1}{4}\phi,$$

$$B_{new} = \frac{1}{4}\alpha + \frac{3}{4}\phi,$$

$$D_{new} = \frac{3}{4}\phi + \frac{1}{4}\beta,$$

wherein said values $A_{new}$, $B_{new}$, $C_{new}$, and $D_{new}$ correspond to said adjusted 4:2:2 chroma, said values $A_{new}$, $B_{new}$, $C_{new}$, and $D_{new}$ vertically interpolated from said values $\alpha$, $\beta$, $\epsilon$, and $\phi$.

10. The method of claim 8 wherein said regenerating is performed using the following equations:

$$\alpha = \frac{7}{4}A - \frac{3}{4}B,$$

$$\beta = \frac{5}{4}B - \frac{1}{4}A,$$

$$\varepsilon = \frac{5}{4}C - \frac{1}{4}D,$$

$$\phi = \frac{7}{4}D - \frac{3}{4}C.$$

wherein A, B, C, and D represent 4:2:2 chroma pixel values, and $\alpha$, $\beta$, $\epsilon$, and $\phi$ represent 4:2:0 chroma pixel values.

11. The method of claim 8 wherein said regenerating is performed using the following equations:

$$\alpha = \frac{3}{4}B_{-1} + \frac{1}{4}A$$

$$\beta = \frac{3}{4}B + \frac{1}{4}A_{+1},$$

$$\varepsilon = \frac{1}{4}D_{-1} + \frac{3}{4}C,$$

$$\phi = \frac{1}{4}D + \frac{3}{4}C_{+1},$$

wherein A, $A_{+1}$, B, $B_{-1}$, C, $C_{+1}$, and D, $D_{-1}$, represent 4:2:2 chroma pixel values, and $\alpha$, $\beta$, $\epsilon$, and $\phi$ represent 4:2:0 chroma pixel values.

12. A system for generating improved 4:2:2 chroma pixels comprising:
a 4:2:2 to 4:2:0 chroma regenerator for converting 4:2:2 chroma to 4:2:0 chroma; and
a 4:2:0 to 4:2:2 chroma generator that weaves pixels from top and bottom fields of 4:2:0 chroma to generate a 4:2:0 chroma frame, said 4:2:0 chroma frame subsequently used for interpolating one or more pixels to generate an adjusted 4:2:2 chroma frame, wherein said 4:2:2 to 4:2:0 chroma regenerator generates chroma values of top field 4:2:0 chroma pixels, $\alpha$ and $\beta$, using corresponding chroma values from top field 4:2:2 chroma pixels, A and B, by way of solving the following simultaneous equations:

$$A = \frac{5}{8}\alpha + \frac{3}{8}\beta,$$

$$B = \frac{1}{8}\alpha + \frac{7}{8}\beta$$

to yield the following equations:

$$\alpha = \frac{7}{4}A - \frac{3}{4}B,$$

$$\beta = \frac{5}{4}B - \frac{1}{4}A.$$

13. A system for generating improved 4:2:2 chroma pixels comprising:
a 4:2:2 to 4:2:0 chroma regenerator for converting 4:2:2 chroma to 4:2:0 chroma; and
a 4:2:0 to 4:2:2 chroma generator that weaves pixels from top and bottom fields of 4:2:0 chroma to generate a 4:2:0 chroma frame, said 4:2:0 chroma frame subsequently used for interpolating one or more pixels to generate an adjusted 4:2:2 chroma frame, wherein said 4:2:2 to 4:2:0 chroma regenerator generates chroma values of bottom field 4:2:0 chroma pixels, $\epsilon$ and $\phi$, using corresponding chroma values from bottom field 4:2:2 chroma pixel values, C and D, by way of solving the following simultaneous equations:

$$C = \frac{7}{8}\varepsilon + \frac{1}{8}\phi,$$

$$D = \frac{3}{8}\varepsilon + \frac{5}{8}\phi$$

to yield the following equations:

$$\varepsilon = \frac{5}{4}C - \frac{1}{4}D,$$

$$\phi = \frac{7}{4}D - \frac{3}{4}C.$$

14. A system for generating improved 4:2:2 chroma pixels comprising:
a 4:2:2 to 4:2:0 chroma regenerator for converting 4:2:2 chroma to 4:2:0 chroma; and
a 4:2:0 to 4:2:2 chroma generator that weaves pixels from top and bottom fields of 4:2:0 chroma to generate a 4:2:0 chroma frame, said 4:2:0 chroma frame subsequently used for interpolating one or more pixels to generate an adjusted 4:2:2 chroma frame, wherein said 4:2:2 to 4:2:0 chroma regenerator generates chroma values from top field 4:2:0 chroma pixels $\alpha$ and $\beta$, using corresponding top field 4:2:2 chroma pixel values associated with pixels A, $A_{+1}$, B, and $B_{-1}$ by way of utilizing the following equations:

$$\alpha = \frac{3}{4}B_{-1} + \frac{1}{4}A$$

$$\beta = \frac{3}{4}B + \frac{1}{4}A_{+1},$$

wherein said $B_{-1}$ denotes a pixel with spatial relationship corresponding to B, said $B_{-1}$ vertically positioned at one A/B pixel pair above B, and said $A_{+1}$ denotes a pixel with spatial relationship corresponding to A, said $A_{+1}$ vertically positioned at one A/B pixel pair below A.

15. A system for generating improved 4:2:2 chroma pixels comprising:
a 4:2:2 to 4:2:0 chroma regenerator for converting 4:2:2 chroma to 4:2:0 chroma; and
a 4:2:0 to 4:2:2 chroma generator that weaves pixels from top and bottom fields of 4:2:0 chroma to generate a 4:2:0 chroma frame, said 4:2:0 chroma frame subsequently used for interpolating one or more pixels to generate an adjusted 4:2:2 chroma frame, wherein said 4:2:2 to 4:2:0 chroma regenerator generates chroma values from bottom field 4:2:0 chroma pixels $\epsilon$ and $\phi$, using corresponding top field 4:2:2 chroma pixel values associated with pixels C, $C_{+1}$, D, and $D_{-1}$ by utilizing the following equations:

$$\varepsilon = \frac{1}{4}D_{-1} + \frac{3}{4}C$$
$$\phi = \frac{1}{4}D + \frac{3}{4}C_{+1},$$

wherein said $D_{-1}$ denotes a pixel with spatial relationship corresponding to D, said $D_{-1}$ vertically positioned at one C/D pixel pair above D, and said $C_{+1}$ denotes a pixel with the spatial relationship corresponding to C, said $C_{+1}$ vertically positioned at one C/D pixel pair below C.

16. A system for generating improved 4:2:2 chroma pixels comprising:
 a 4:2:2 to 4:2:0 chroma regenerator for converting 4:2:2 chroma to 4:2:0 chroma; and
 a 4:2:0 to 4:2:2 chroma generator that weaves pixels from top and bottom fields of 4:2:0 chroma to generate a 4:2:0 chroma frame, wherein said 4:2:0 to 4:2:2 chroma generator computes said adjusted 4:2:2 chroma by using the following equations:

$$A_{new} = \frac{1}{4}\varepsilon + \frac{3}{4}\alpha,$$
$$C_{new} = \frac{3}{4}\alpha + \frac{1}{4}\phi,$$
$$B_{new} = \frac{1}{4}\alpha + \frac{3}{4}\phi,$$
$$D_{new} = \frac{3}{4}\phi + \frac{1}{4}\beta,$$

wherein said values $A_{new}, B_{new}, C_{new},$ and $D_{new}$ correspond to said adjusted 4:2:2 chroma, said values $A_{new}, B_{new}, C_{new},$ and $D_{new}$ vertically interpolated from said values $\alpha, \beta, \varepsilon,$ and $\phi$.

17. A system for generating improved 4:2:2 chroma pixels comprising:
 a 4:2:2 to 4:2:0 chroma regenerator for converting 4:2:2 chroma to 4:2:0 chroma;
 a 4:2:0 to 4:2:2 chroma generator that weaves pixels from top and bottom fields of 4:2:0 chroma to generate a 4:2:0 chroma frame, said 4:2:0 chroma frame subsequently used for interpolating one or more pixels to generate an adjusted 4:2:2 chroma frame; and
 a hardware and/or software used for blending said adjusted 4:2:2 chroma to said 4:2:2 chroma, said blending used to generate an improved 4:2:2 chroma.

18. The system of claim 17 wherein said hardware and/or software is controlled by way of an input, said input indicating the level of motion present in said 4:2:2 chroma.

19. The system of claim 18 wherein said input controls blending of said adjusted 4:2:2 chroma and said 4:2:2 chroma such that the amount of said adjusted 4:2:2 chroma used in said blending increases as said level of motion decreases.

20. A system for generating an improved 4:2:2 chroma comprising:
 hardware operable for, at least:
  receiving a 4:2:2 chroma;
  inputting said 4:2:2 chroma into a 4:2:2 to 4:2:0 chroma regenerator;
  selecting an algorithm to be used by said 4:2:2 to 4:2:0 chroma regenerator;
  using said algorithm to regenerate 4:2:0 chroma;
  weaving pixels from top and bottom fields of said 4:2:0 chroma to generate a 4:2:0 chroma frame;
  interpolating values provided by said 4:2:0 chroma frame to generate an adjusted 4:2:2 chroma;
  inputting said adjusted 4:2:2 chroma and said 4:2:2 chroma into a blending system used for blending two inputs;
  determining a first amount of said adjusted 4:2:2 chroma and a second amount of said 4:2:2 chroma for said blending; and
  adding said first and second amounts to generate an improved 4:2:2 chroma.

21. The system of claim 20 wherein said algorithm utilizes the following equations for regenerating said 4:2:0 chroma:

$$A = \frac{5}{8}\alpha + \frac{3}{8}\beta,$$
$$B = \frac{1}{8}\alpha + \frac{7}{8}\beta,$$
$$C = \frac{7}{8}\varepsilon + \frac{1}{8}\phi,$$
$$D = \frac{3}{8}\varepsilon + \frac{5}{8}\phi,$$

wherein A, B, C, and D represent 4:2:2 chroma pixel values, and $\alpha, \beta, \varepsilon,$ and $\phi$ represent 4:2:0 chroma pixel values.

22. The system of claim 21 wherein said equations are used if said 4:2:2 chroma was generated using a 2-tap linear interpolator.

23. The system of claim 20 wherein said algorithm utilizes the following equations for regenerating said 4:2:0 chroma:

$$\alpha = \frac{3}{4}B_{-1} + \frac{1}{4}A$$
$$\beta = \frac{3}{4}B + \frac{1}{4}A_{+1},$$
$$\varepsilon = \frac{1}{4}D_{-1} + \frac{3}{4}C,$$
$$\phi = \frac{1}{4}D + \frac{3}{4}C_{+1},$$

wherein $A, A_{+1}, B, B_{-1}, C, C_{+1},$ and $D, D_{-1},$ represent 4:2:2 chroma pixel values, and $\alpha, \beta, \varepsilon,$ and $\phi$ represent 4:2:0 chroma pixel values.

24. The system of claim 20 wherein said determining is based on an input signal for indicating the level of motion present in said 4:2:2 chroma.

25. A system for processing a received 4:2:2 chroma formatted video to improve the appearance of displayed video comprising:
 hardware operable for, at least:
  identifying undesirable pixels of said 4:2:2 chroma that are vertically interpolated using chroma associated with vertically distant 4:2:0 pixels; and
  substituting chroma values associated with said undesirable pixels of said 4:2:2 chroma using a weighted average of one or more chroma values associated with one or more desirable pixels associated with said 4:2:2 chroma.

26. The system of claim 25 wherein a weight of one or more weights of said weighted average is inversely proportional to the vertical distance between an undesirable pixel of said undesirable pixels and a desirable pixel of said one or more desirable pixels.

27. A system for generating an improved 4:2:2 chroma comprising:

hardware operable for, at least:
- regenerating 4:2:0 chroma from a 4:2:2 chroma;
- weaving said 4:2:0 chroma to produce a 4:2:0 chroma frame;
- interpolating said 4:2:0 chroma frame to generate said adjusted 4:2:2 chroma; and
- adding a determined first level of said 4:2:2 chroma to a determined second level of said adjusted 4:2:2 chroma.

28. The system of claim 27 wherein said interpolating is performed by way of using the following equations:

$$A_{new} = \frac{1}{4}\varepsilon + \frac{3}{4}\alpha,$$

$$C_{new} = \frac{3}{4}\alpha + \frac{1}{4}\phi,$$

$$B_{new} = \frac{1}{4}\alpha + \frac{3}{4}\phi,$$

$$D_{new} = \frac{3}{4}\phi + \frac{1}{4}\beta,$$

wherein said values $A_{new}$, $B_{new}$, $C_{new}$, and $D_{new}$ correspond to said adjusted 4:2:2 chroma, said values $A_{new}$, $B_{new}$, $C_{new}$, and $D_{new}$ vertically interpolated from said values $\alpha$, $\beta$, $\varepsilon$, and $\phi$.

29. The system of claim 27 wherein said regenerating is performed using the following equations:

$$\alpha = \frac{7}{4}A - \frac{3}{4}B,$$

$$\beta = \frac{5}{4}B - \frac{1}{4}A,$$

$$\varepsilon = \frac{5}{4}C - \frac{1}{4}D,$$

$$\phi = \frac{7}{4}D - \frac{3}{4}C,$$

wherein A, B, C, and D represent 4:2:2 chroma pixel values, and $\alpha$, $\beta$, $\varepsilon$, and $\phi$ represent 4:2:0 chroma pixel values.

30. The system of claim 27 wherein said regenerating is performed using the following equations:

$$\alpha = \frac{3}{4}B_{-1} + \frac{1}{4}A$$

$$\beta = \frac{3}{4}B + \frac{1}{4}A_{+1},$$

$$\varepsilon = \frac{1}{4}D_{-1} + \frac{3}{4}C,$$

$$\phi = \frac{1}{4}D + \frac{3}{4}C_{+1},$$

wherein A, $A_{+1}$, B, $B_{-1}$, C, $C_{+1}$, and D, $D_{-1}$, represent 4:2:2 chroma pixel values, and $\alpha$, $\beta$, $\varepsilon$, and $\phi$ represent 4:2:0 chroma pixel values.

* * * * *